United States Patent [19]

Hutchison et al.

[11] 3,857,065

[45] Dec. 24, 1974

[54] GAS-FILLED TUBE CONTROL APPARATUS AND METHOD

[75] Inventors: Arthur H. Hutchison; Lonnie S. McMillian, both of Huntsville, Ala.

[73] Assignee: Abbott Laboratories, North Chicago, Ill.

[22] Filed: Feb. 22, 1972

[21] Appl. No.: 228,174

[52] U.S. Cl............. 315/340, 315/DIG. 5, 315/240
[51] Int. Cl. ......................................... H05b 37/00
[58] Field of Search ....... 178/6.7, 6.7 A, 7.4, 7.3 D, 178/7.5 D; 315/DIG. 4, DIG. 7, 200 A, 240, 340, DIG. 5; 351/31

[56] References Cited
UNITED STATES PATENTS

| | | | |
|---|---|---|---|
| 3,341,951 | 9/1967 | Barnette ........................... | 351/31 X |
| 3,444,311 | 9/1967 | Nuckolls ......................... | 315/DIG. 5 |
| 3,483,428 | 12/1969 | LaPlante ......................... | 315/DIG. 5 |
| 3,549,887 | 12/1970 | Hansen ............................. | 250/71.5 |
| 3,675,074 | 7/1972 | Dennewitz .......................... | 315/159 |
| 3,678,277 | 7/1972 | Greenspan et al.............. | 250/71.5 S |

Primary Examiner—Herman Karl Saalbach
Assistant Examiner—Lawrence J. Dahl
Attorney, Agent, or Firm—Molinare, Allegretti, Newitt & Witcoff

[57] ABSTRACT

The disclosure describes an apparatus and a method for maintaining the light intensity produced by a gas-filled tube at a predetermined value for a predetermined time period. The apparatus preferably comprises a control means, such as a transistor current sink, connected in series with the tube for applying a voltage across the tube at a predetermined time and for controlling the amount of current flowing through the tube in order to regulate the intensity of light produced thereby. A logic circuit is provided for generating a first operating signal at the time voltage is applied to the tube, and a resistive component in series with the current sink is provided for generating a second operating signal at the commencement of current conduction through the tube. A termination signal is generated by a monostable multivibrator within a predetermined time period after the commencement of current conduction through the tube. A generating means, preferably comprising a resistive-capacitive storage circuit that is charged by a current source, generates a first control signal linearly varying in a first direction in response to the first operating signal. The generation of the first control signal is terminated in response to the second operating signal, and thereafter the generating means generates a second control signal exponentially varying in a second direction. The control signals are transmitted to the control means so that the initial amount of current flowing through the tube is proportional to the length of time between the application of voltage across the tube and the commencement of current conduction through the tube. Thereafter, the current flow through the tube decreases in accordance with the second control signal so that the intensity of light produced by the tube remains constant until the termination signal is received. In response to the termination signal, the control means substantially prevents current flow through the tube in order to terminate light production.

25 Claims, 6 Drawing Figures

GAS-FILLED TUBE CONTROL APPARATUS AND METHOD

BACKGROUND OF THE INVENTION

This invention relates to electrical apparatus for controlling gas-filled tubes, and more particularly relates to electrical circuits for controlling the light produced by gas-filled tubes.

There is a class of gas-filled tubes generally called cold cathode devices which have a cathode and an anode enclosed in a gas-filled envelope. Before such tubes will pass current from cathode to anode, a voltage must be applied across the tube which is sufficiently large to cause the gas inside the envelope to ionize, thereby providing a conducting path for electrons. This threshold or ionization voltage above which the gas will ionize is dependent on things like the type gas, gas pressure, and spacing of the electrodes inside the tube.

One type of gas-filled tube within the class under consideration is a device called a glow modulator which has a particular mixture of gases that produce an intense white light when ionized. Glow modulator tubes are capable of producing a burst of light at random intervals and may be used for exposing film or other lighting purposes. The tubes are particularly useful in facsimile work or in work requiring a highly controlled burst of light.

Applicants have found that the foregoing characteristics make a glow modulator tube well adapted for use in a scintillation scanner wherein a pictorial representation of a human organ is synthesized by exposing a light-sensitive film to short pulses or bursts of light. Scintillation scanners are used in diagnosing the condition of various tissues of the human body, including tumors. In order to use a scintillation scanner, a substance which is known to accumulate in a body tissue under investigation is introduced into a patient's bloodstream by ingestion or injection. Prior to introduction, the substance is treated with a radioactive isotope which emits gamma radiation. After the patient has received the radioactive substance, a scintillation detector scans the patient and receives the gamma radiation from the radioactive substance that has accumulated in the tissue. For each gamma-ray received, a pulse of light is produced by the glow modulator tube which is scanned over the surface of a light-sensitive film in coordination with the scanning movement of the detector. The multiple light pulses from the glow modulator tube produce a photographic image which represents the concentration of the substance in the tissue. This photographic image is used by a physician as an aid to determine the condition of the tissue, thereby providing him with a valuable diagnostic tool.

In order to provide a complete and accurate record of the tissue under investigation, it is highly desirable, if not essential, to closely control the light emitted by the glow modulator tube so that the concentration of the radioactive substance in the tissue is shown on the film as accurately as possible. In order to achieve the requisite degree of accuracy, the film must be exposed to the same amount of light in response to the receipt of each gamma-ray. If the intensity or the duration of light produced by the tube in response to each gamma-ray differs, the resulting opacity of the film will also vary, thereby producing a photographic image that does not accurately reflect the concentration of the radioactive substance in the tissue.

In the past, efforts to accurately control the amount of light generated by a gas-filled tube have met with only limited success. Such methods include the use of heaters, small radioactive sources within the tube, or the maintenance of a small amount of current flow in the tube in order to keep the gas in the tube continuously ionized. The latter method is undesirable, since a low-intensity glow is always present. Given sufficient time, this low-intensity glow can expose a photographic film, thereby distorting the resulting photographic image. In addition, this technique renders the tube extremely sensitive to minute temperature variations.

SUMMARY OF THE INVENTION

Applicants have discovered that the failure of prior art devices to accurately control the amount of light generated by a gas-filled tube is due in part to certain undesirable characteristics of the tube itself. One such undesirable characteristic is that the gas in the tube is not ionized as soon as a voltage above the ionization potential is applied across the tube. After the voltage is applied, there is an ionization time delay prior to the time the tube gas is ionized. This ionization time delay prevents the tube from initially generating light which can only be produced after the gas is ionized and current is passed through the tube.

Applicants surprisingly have discovered that this ionization time delay is dependent on the temperature of the gas in the tube. Applicants also have discovered that the temperature of the gas in the tube is a function of recent past activity. For example, the gas temperature is a function of the percentage of time during which the tube has been producing light in the recent past, and the elapsed time since the tube ceased to produce light. This is, the temperature depends on the frequency at which the tube is being pulsed and the time the tube is allowed to remain on.

Applicants further have discovered that tube light output efficiency is a function of the temperature of the gas in the tube. Even more surprisingly, applicants have discovered that the period of time between the application of voltage to the tube and the commencement of current flow through the tube can be used as a measure of tube temperature, and that the period of time during which the tube has been producing light also can be used as a measure of tube temperature.

According to one principal feature of the present invention, applicants have been able to use the above-described discoveries in order to accurately maintain the light intensity produced by a gas-filled tube at a predetermined constant value. According to this feature of the invention, applicants employ a control means for applying a voltage across the tube at a predetermined time and for controlling the amount of current flowing through the tube in response to control signals. Preferably, the amount of current allowed to flow through the tube is proportional to the magnitude of the control signals received by the control means. Means are also provided for generating a first operating signal at or subsequent to the predetermined time and for generating a second operating signal at or subsequent to the commencement of current conduction through the tube. Generating means are employed to generate first and second control signals. The first control signal varies monotonically in a first direction in response to the first operating signal and is terminated in response to the second operating signal. The second control signal varies monotonically in a second direction in response to the second operating signal.

According to a principal method feature of the invention, applicants have discovered that the light intensity of a gas-filled tube can be maintained at a constant value by employing two techniques:

Firstly, the initial amount of current flow through the tube is increased in proportion to the length of time between the application of voltage across the tube and the commencement of current conduction through the tube. Applicants have found that this is an important feature which is required in order to produce an initial light intensity that equals the steady state light intensity produced after the gas temperature has warmed up due to current conduction.

Secondly, after light is initially produced by the tube, the current is decreased in a controlled manner to some steady state value. Applicants have found that this feature is required in order to maintain the light intensity at its steady state value. By using the foregoing techniques, applicants have been able to operate a gas-filled tube so that the initial and steady state light intensity is substantially constant, thereby drastically increasing the accuracy with which the light output of the tube may be controlled.

According to another principal feature of the invention, applicants have used the above-described discoveries about the characteristics of a gas-filled tube in order to accurately control the duration of a light pulse produced by the tube to a predetermined time period. In order to achieve this result, applicants employ control means for applying a voltage across the tube and a means for generating an operating signal at or subsequent to the commencement of current conduction through the tube. Means are also employed for generating a termination signal within a predetermined time period after receipt of the operating signal. The control means are operated in response to the termination signal, so that current flow through the tube is substantially decreased and the tube ceases to produce light.

Applicants have determined that the foregoing apparatus is capable of accurately controlling the precise duration of light produced by a gas-filled tube, thereby drastically increasing the accuracy with which an event represented by a burst of light may be recorded.

According to another feature of the invention, applicants have found that the above-described techniques may be combined in order to produce an apparatus and method capable of maintaining the light intensity produced by a gas-filled tube at a predetermined constant value for a predetermined time period.

DESCRIPTION OF THE DRAWINGS

These and other advantages and features of the present invention will become apparent in connection with the attached drawings, wherein like numbers refer to like parts throughout, and wherein.

DESCRIPTION OF THE PREFERRED EMBODIMENT

Figure 1:
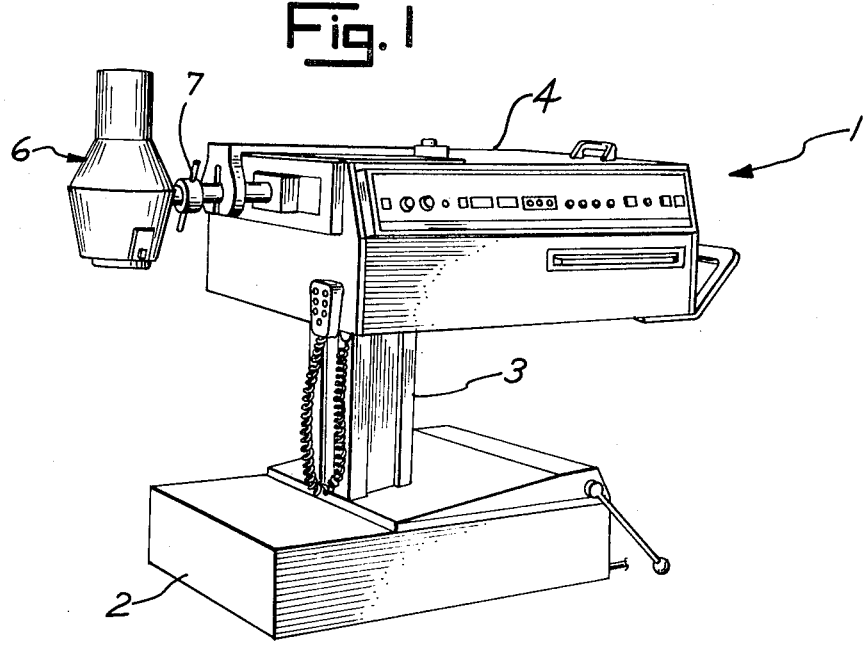
FIG. 1 is a perspective view of a scintillation scanner incorporating a preferred form of gas-filled tube control apparatus made in accordance with the present invention.
Figure 4:
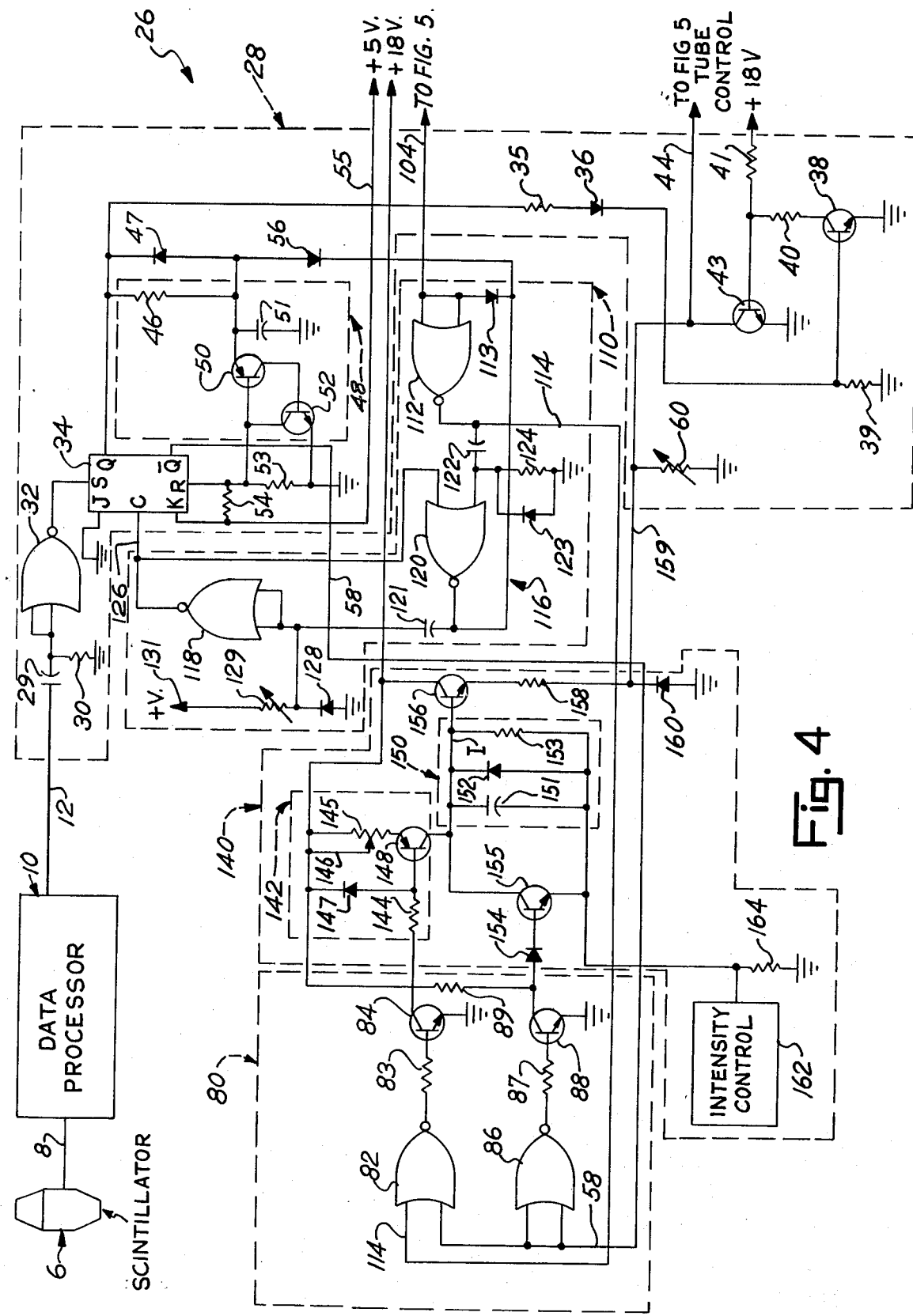
FIGS. 4 and 5 are electrical schematic drawings showing a preferred embodiment of the present invention used in connection with exemplary components of a scintillation scanner.
Figure 5:
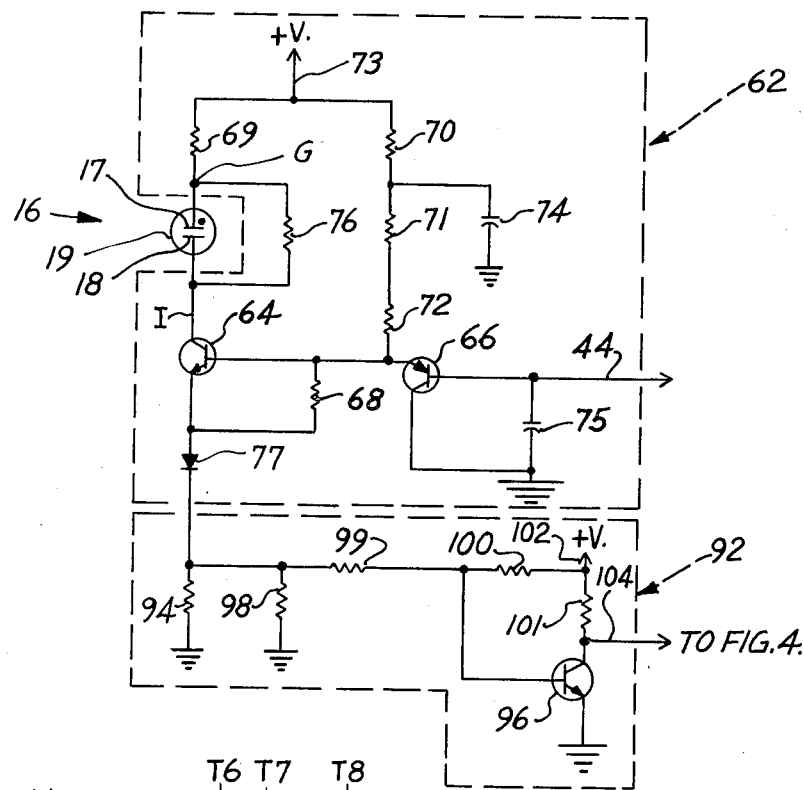

Referring to FIG. 1, the present invention may be used in connection with an exemplary scintillation scanner 1 comprising a base 2 and a stand 3 that support a cabinet 4 which encloses well-known electronic and mechanical scanning components. The scanner also comprises a scintillator assembly 6 which detects gamma-rays being emitted from certain tissues of a patient. The scintillator assembly is mounted on a boom 7 which is moved back-and-forth by a conventional rectilinear scanning mechanism held within cabinet 4. Cabinet 4 also houses a photographic chamber in which light pulses corresponding to gamma-rays received from the patient are recorded on a photographic film. Referring to FIG. 5, the film is preferably exposed by a gas-filled glow modulator tube 16 comprising an anode 17 and a cathode 18 that are enclosed with a gas-filled glass envelope 19. One such tube is a Sylvania model R1131C. Tube 16 is mounted directly on boom 7 within the photographic chamber. As the scintillator assembly is moved back-and-forth over a patient in order to detect gamma-rays being emitted by the patient, the tube scans over the film in the same scan pattern. By well-known means, the scintillator assembly 6 converts each received gamma-ray into a corresponding electrical signal. Referring to FIG. 4, the electrical signal is transmitted over a conductor 8 to a data processor 10 which produces a well-defined single pulse representing the receipt of a single gamma-ray on an output conductor 12.

As previously explained, it is desirable to expose the photographic film to the same amount of light in response to the receipt of each individual gamma-ray. However, experience has shown that it is extremely difficult to control the intensity and duration of light pulses produced by a glow modulator tube. These difficulties are schematically illustrated by the wave forms of FIGS. 2 and 3 of the drawings.

Figure 2:
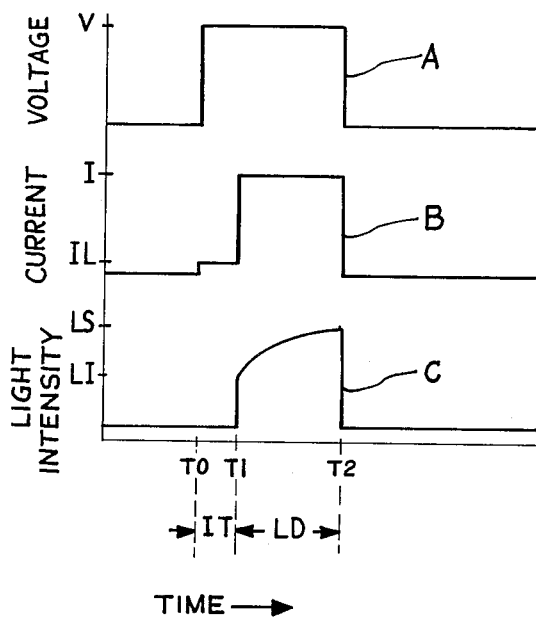
FIGS. 2 and 3 represent exemplary and idealized wave forms illustrating the voltage, current, and light produced by a representative gas-filled glow modulator tube which is controlled by conventional means.

Referring to FIG. 2, if conventional apparatus were used for producing a pulse or burst of light from tube 16 in order to record a single gamma-ray event, a square way voltage, such as voltage A would normally be placed across the anode-cathode terminals of the tube at time T0. As shown by wave form B, depending on the temperature and past activity of the tube, no current would immediately flow through the tube, other than a minute leakage current IL. The conduction of current through the tube would be delayed by an arbitrary ionization time IT. Moveover, when current would flow through the tube at time T1, applicants have discovered that the light intensity initially produced is only a fraction of the steady state light intensity value. For example, as shown by wave form C, the initial light intensity at time T1 might be LI, whereas the steady state value would be LS. As shown by wave form C, applicants have also discovered that the light intensity produced by the tube increases from its initial value LI to its steady state value LS at a relatively slow rate.

If tube 16 always produced a light intensity such as that shown by wave form C in response to a voltage pulse such as wave form A, the resulting photographic image of the gamma-ray which triggered voltage wave form A would at least be consistent. However, applicants have discovered that the light intensity wave form produced by tube 16 is a function of temperature and the recent past activity of the tube. As a result, the actual light intensity wave form produced by the tube in response to voltage wave form A might be quite different from light wave form C. This phenomenon is illustrated in FIG. 3.

Figure 3:
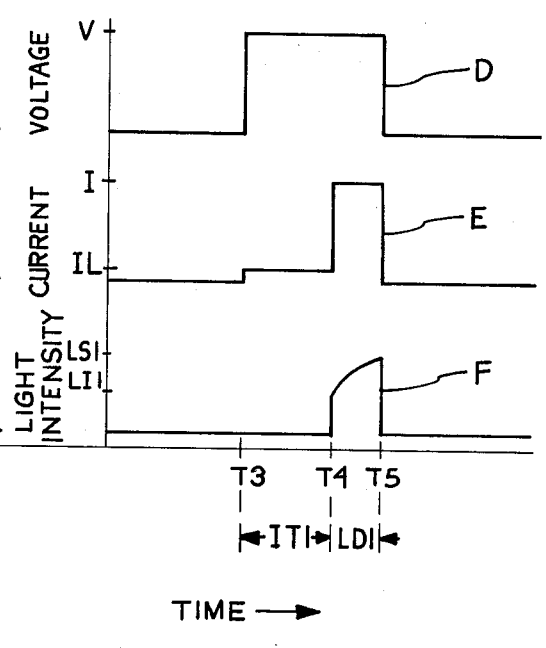

The FIG. 3 wave forms were prepared assuming that the temperature of the gas in tube 16 was substantially lower than the temperature of the gas for which the FIG. 2 wave forms were prepared. This condition might result from passing scintillator assembly 6 over an area of the patient that emits relatively few gamma-rays, so that tube 16 is pulsed at a relatively low rate. It is also assumed that the voltage pulse placed across the tube in its lower temperature condition (wave form D) is identical to the voltage pulse placed across the tube in its higher temperature condition (wave form A). For this tube condition, it can be seen that the ionization time IT1 is substantially increased and that the duration of current flow through the tube is substantially decreased (wave form E). In addition, the initial and final light intensity values LI1 and LS1, respectively, (wave form F) are somewhat lower than the corresponding values shown in FIG. 2 (wave form C). It also may be noted that the total amount of light produced in response to identical voltage pulses A and D is quite different. The total amount of light is represented by the area under curves C and F, respectively. It may be observed that the area under curve F is only a small fraction of the area under curve C. As a result, a gamma-ray event recorded in response to voltage pulse A would appear darker and wider than an identical gamma-ray event recorded in response to identical voltage pulse D. As previously explained, the difference in the appearance of the recorded image of the gamma-rays would complicate interpretation of the resulting photographic film.

Referring to FIGS. 4 and 5, in order to correct the foregoing deficiencies based on applicants' discoveries, a preferred form of the present invention would basically comprise a control system 26, including a logic control circuit 28 and a tube control circuit 62; a first operating circuit 80; a second operating circuit 92; a duration circuit 110; and a generating circuit 140.

Referring to FIG. 4, logic control circuit 28 comprises a coupling capacitor 29 and a biasing resistor 30 that are connected to an input of a NOR gate 32. The output of NOR gate 32 is connected to the set(s) input of a J-K flipflop 34. The Q output of flipflop 34 is connected through a resistor 35 and a diode 36 to the base of a gating transistor 38 that is biased by a resistor 39 connected to ground potential. The collector of transistor 38 is connected through resistors 40 and 41 to a +18 volt supply. The junction of resistors 40 and 41 is connected to the base of another gating transistor 43 that has its collector connected over an output conductor 44 to tube control circuit 62. The Q output of flipflop 34 is also connected through a resistor 46 and a diode 47 to the input to a fail-safe circuit 48. Circuit 48 comprises transistors 50 and 52, a capacitor 51, and resistors 53 and 54, all connected as shown. Resistor 54 is connected to a +5 volt supply conductor 55. The emitter of transistor 50 is also connected through a diode 56 to an input of duration circuit 110. As shown in FIG. 4, the junction of resistors 53 and 54 is connected to the reset (R) input of flipflop 34 so that the fail-safe circuit will prevent tube 16 from continuously conducting current if duration circuit 110 fails to operate. Capacitor 51 and resistor 46 provide a timing circuit which operates the fail-safe circuit. The $\overline{Q}$ output flipflop 34 is connected over a conductor 58 in order to operate operating circuit 80, and the J input of flipflop 34 is connected to ground potential. Logic control circuit 28 also comprises an adjustable density control potentiometer 60 so that the density with which the occurrence of gamma-ray events are recorded on film may be controlled by an operator.

Referring to FIG. 5, tube control circuit 62 comprises a current sink including a transistor 64 having its collector-emitter junction connected in series with tube 16. Circuit 62 also comprises a transistor 66 connected as an emitter follower which provides an adequate driving current for transistor 64. Circuit 62 further comprises resistors 68, 69, 70, 71 and 72 that are connected as shown and are supplied by a positive voltage supply conductor 73. Circuit 62 further comprises capacitors 74 and 75 and a diode 77 that are connected as shown. A resistor 76 is connected in parallel with tube 16 to prevent undesired current leakage through transistor 64 from ionizing gas in the tube and from causing a voltage build-up and premature firing of the tube.

Referring to FIG. 4, operating circuit 80 comprises a NOR gate 82 that has its output conducted through a resistor 83 to the base of a gating transistor 84. NOR gate 82 generates an operating signal that energizes generating circuit 140 as soon as voltage is placed across tube 16. Operating circuit 80 also comprises another NOR gate 86 which has its output transmitted through a resistor 87 to a gating transistor 88 that receives current from a +18 volt supply through a resistor 89. NOR gate 86 generates an operating signal which discharges generating circuit 140 in response to an input signal conducted over conductor 58 from the $\overline{Q}$ output of flipflop 34.

Referring to FIG. 5, operating circuit 92 comprises a resistor 94 connected in series with tube 16 and transistor 64 in the manner shown. Circuit 92 further comprises a transistor 96 that is connected to resistors 98, 99, 100 and 101 in the manner shown. Current is supplied to the transistor through a positive voltage supply conductor 102. At the commencement of current conduction through tube 16, the collector of transistor 96 supplies an operating signal over a conductor 104 to duration circuit 110 (FIG. 4).

Referring to FIG. 4, duration circuit 110 comprises a NOR gate 112 which receives an input signal transmitted over conductor 104 from operating circuit 92. Conductor 104 is also connected through a diode 113 and through a diode 56 to the input of fail-safe circuit 48. The output of NOR gate 112 is connected over a conductor 114 to an input of NOR gate 82 which supplies an operating signal to the generating circuit at the commencement of current conduction through tube 16. Duration circuit 110 also includes a monostable multivibrator 116 comprising NOR gates 118 and 120, capacitors 121 and 122, a diode 123 and a resistor 124, all connected as shown. The monostable multivibrator produces a termination signal which is transmitted over a conductor 126 to the clock input of flipflop 34. The time period of the monostable multivibrator may be controlled through a diode 128 and an adjustable duration control potentiometer 129 that is connected to a positive source of voltage through a supply conductor 131.

Referring to FIG. 4, generating circuit 140 comprises a constant current source 142 which includes resistors 144 and 145. The effective value of resistor 145 may be controlled through a movable wiper arm 146. Current source 142 also comprises a diode 147 and a transistor 148 that are connected as shown. Generating circuit 140 comprises a storage circuit 150 including a capacitor 151, a diode 152 and a resistor 153 connected as shown. Diode 152 limits the charge on capacitor 151 in order to prevent an excessive voltage build-up. Generating circuit 140 further comprises a gating diode 154 and a gating transistor 155 that discharges storage circuit 150 in response to the termination signal. The output from storage circuit 150 is connected through a transistor 156 arranged as an emitter follower and through a resistor 158 to a conductor 159 that transmits control signals to control system 26. Generating circuit 140 further comprises a diode 160 that limits the current through tube 16 to a predetermined maximum value. An intensity control circuit 162 is provided in generating circuit 140 in order to maintain a controlled value of voltage across a resistor 164. Circuit 162 comprises a voltage supply or additional adjustment circuitry for controlling tube 16.

OPERATION OF THE SYSTEM

In order to use the system to make a photographic image of a particular tissue in a medical patient, the patient ingests or is injected with a substance which has been doped with a gamma-ray emitting radioactive isotope. The patient is then placed under the scintillator assembly 6, and the assembly is scanned across the area of interest by well-known apparatus. As soon as a gamma-ray is received, it is converted to an electrical signal by scintillator assembly 6 and data processor 10. Data processor 10 operates on the signal to produce a well-defined pulse which is inverted by NOR gate 32 (FIG. 4) and is used to set the Q output of flipflop 34 to its logical 1 state. This condition of the Q output turns on transistor 38 and turns off transistor 43 so that the voltage maintained on storage circuit 150 by intensity control circuit 162 is transmitted over conductors 159 and 44 to tube control circuit 62. As shown by wave form I of FIG. 6, at time T6, when the gamma-ray is received, voltage V2 is maintained at the base of transistor 156. In response to voltage V2, at time T6, transistor 64 is turned on (FIG. 5), thereby placing voltage V1 (wave form G of FIG. 6) across tube 16. As soon as voltage V1 is placed across tube 16, a small leakage current IL1 begins to flow through resistor 76 (FIG. 5). This leakage current is shown in wave form J of FIG. 6, which represents the current flowing through the collector of transistor 64. Leakage current IL1 continues to flow during the time required for the gas in tube 16 to ionize (i.e., time IT2 of FIG. 6).

At the same time the Q ouptut flipflop 34 is switched to its 1 state (i.e., time T6 of FIG. 6), the $\bar{Q}$ output flipflop 34 is switched to its 0 state. This 0 state condition is transmitted over conductor 58 to one input of NOR gate 82. At the same time, the input of NOR gate 82 connected to conductor 114 is also at its 0 state so that the output of NOR gate 82 is switched to its 1 state, thereby generating an operating signal which turns on transistor 84 and causes constant current source 142 to supply current to storage circuit 150. At time T6, conductor 114 is held in its 0 state because there is substantially no current flowing through tube 16. As a result, transistor 96 (FIG. 5) is switched to its off condition so that conductor 104 is in its logical 1 state. This condition dictates that the output of NOR gate 112 is switched to its 0 state, so that conductor 114 supplies a 0 state input to NOR gate 82.

As soon as the operating signal is produced by NOR gate 82 at time T6, storage circuit 150 begins to generate a linear ramp control signal K (wave form I of FIG. 6) which increases the control voltage available on conductor 159. As indicated in FIG. 4, wave form I represents the voltage generated at the base of transistor 156. It should be noted that signal K is a monotonically varying signal, i.e., a signal that either increases or decreases in only a single direction as time increases. By the time the gas in tube 16 ionizes (i.e., time T7 of FIG. 6), the voltage generated by storage circuit 150 has increased to a value V3 which is dependent on the duration of time between the application of voltage across tube 16 and the commencement of current conduction through tube 16. This voltage is transmitted through conductors 159 and 44 to tube control circuit 62, so that an initial current $I_I$ (wave form J of FIG. 6) is conducted through tube 16. It should be noted that this initial current $I_I$ is proportional to the amplitude of signal K and is substantially greater than would be the case if ramp control signal K were not generated by storage circuit 150. Applicants have found that by generating a linear ramp control signal K, the initial current through tube 16 can be increased so that the initial amount of light generated by the tube is substantially equal to the steady state value.

Figure 6:
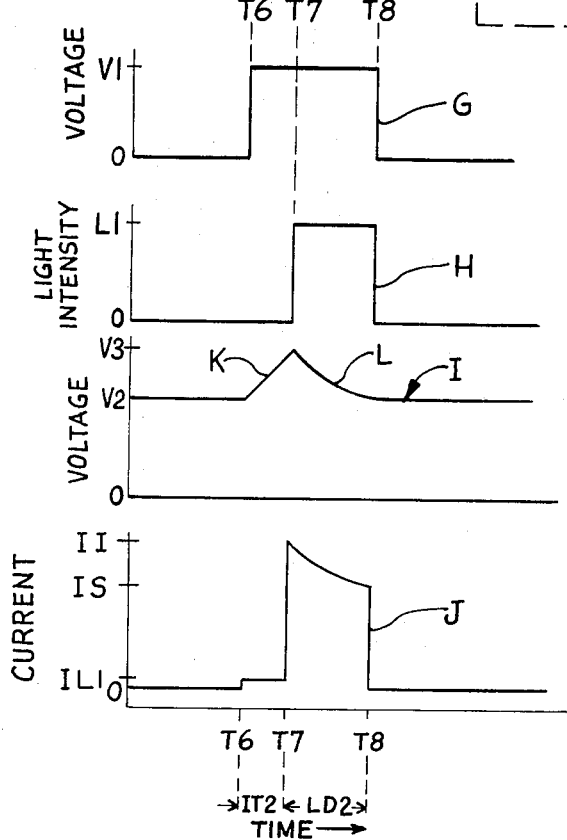
FIG. 6 is a drawing of idealized wave forms showing the voltage, current, and light produced by certain portions of the circuitry illustrated in FIGS. 4 and 5.

As shown by wave form H of FIG. 6, the intensity of light produced by tube 16 remains constant during time LD2.

At the commencement of current conduction through tube 16 (i.e., time T7) the voltage across resistor 94 (FIG. 5) increases so that transistor 96 is switched to its conducting state, thereby switching conductor 114 to its 1 state through NOR gate 112 (FIG. 4). As a result, the output of NOR gate 82 reverts to its 0 state, thereby terminating the generation of linear ramp control signal K (FIG. 6). At this instant in time, the charge stored on capacitor 151 begins to discharge through resistor 153 so that an exponentially decreasing control signal L (wave form I of FIG. 6) is generated by storage circuit 150. It should be noted that control signal L is also a monotonically varying signal. Applicants have found that by generating an exponentially decreasing signal L and by transmitting the signal to tube control circuit 62, the current flowing through the tube is decreased in a manner which matches the increasing output of light from tube 16 after the commencement of current conduction. (See wave form J of FIG. 6). As a result, the light intensity produced by the tube remains substantially constant at value L1, as shown by wave form H (FIG. 6).

As previously described, as soon as current conduction through the tube commences at time T7, the output of NOR gate 112 is switched to its 1 state, thereby terminating production of the operating signal from NOR gate 82. At the same time, monostable multivibrator 116 is energized so that a termination signal is generated on conductor 126 within a predetermined time period after the commencement of current conduction through tube 16 (i.e., time T7). As soon as the termination signal is produced at time T8, it is transmitted to the clock (C) input of flipflop 34, thereby switching the Q output to its 0 state and the $\overline{Q}$ output to its 1 state. Transistor 38 is then switched to its off condition, transistor 43 is switched to its on condition, and the control signals available on conductor 159 are shunted to ground. As a result, transistor 64 (FIG. 5) is switched to its off condition so that current ceases to flow through the tube and light production is terminated. This result is shown in wave forms H and J of FIG. 6 at time T8.

At the same time flipflop 34 is clocked by the termination signal on conductor 126 (i.e., time T8), the $\overline{Q}$ output of flipflop 34 is switched to its 1 state, which is transmitted over conductor 58 to NOR gate 86. As a result, NOR gate 86 produces a discharge signal which switches off transistor 88 and switches on transistor 155, thereby providing a conducting path which discharges storage circuit 150 to voltage level V2, as shown by wave form I in FIG. 6. Thereafter, the system is ready for another cycle of operations as soon as another gamma-ray is received by scintillator assembly 6 and is processed by data processor 10.

In order to adjust the system prior to the foregoing operation, the operator places scintillator assembly 6 over the area of the patient having the highest rate of gamma-ray activity. This rate may be indicated by a variety of devices such as a digital readout meter or a loudspeaker. As soon as the area of greatest activity is reached, the operator adjusts potentiometer 129 which controls the time required for monostable multivibrator 116 to produce a termination signal. By adjusting potentiometer 129, the width of each light pulse is set to a predetermined normalized time period represented by period LD2 in FIG. 6. This adjustment controls the density with which the area of highest gamma-ray activity will appear on the photographic film exposed by tube 16. This value may be set to the operator's individual taste based on his experience using the apparatus. After potentiometer 129 is adjusted, the apparatus will continue to produce light pulses in the above-described manner which have a time duration LD2.

During the initial adjustment period, the operator may also adjust potentiometer 60 (FIG. 4) to control the nominal intensity of light produced by tube 16. This potentiometer may also be adjusted to the operator's personal taste based on his experience using the system. Once potentiometer 60 is adjusted, the system will continue to produce light pulses having the nominal value selected, such as light intensity $L_1$ shown in wave form H of FIG. 6.

What is claimed is:

1. In a system comprising a gas-filled tube that produces light by conducting current after a predetermined voltage is applied across the tube, improved apparatus for maintaining the light intensity at a predetermined value comprising:
   control means for applying the predetermined voltage across the tube at a predetermined time and for controlling the amount of current flowing through the tube in response to a control signal;
   first means for generating a first operating signal in response the predetermined voltage applied across the tube;
   second means for generating a second operating signal in response to the current flowing through the tube;
   generating means for generating a first control signal monotonically varying in a first direction in response to the first operating signal, for terminating the generation of said first control signal in response to the second operating signal and for generating a second control signal monotonically varying in a second direction in response to the second operating signal; and
   means for transmitting the first and second control signals to the control means, whereby the initial amount of current flow through the tube is proportional to the length of time between the application of voltage across the tube and the commencement of current conduction through the tube and wherein the current flow through the tube decreases subsequent to the initial current flow so that the intensity of light produced by the tube remains substantially constant.

2. Apparatus, as claimed in claim 1, wherein the control means comprises an electric current valve connected in series with the tube.

3. Apparatus, as claimed in claim 1, wherein the first means comprises an electronic logic circuit.

4. Apparatus, as claimed in claim 1, wherein the second means comprises a resistance connected in series with the tube.

5. Apparatus, as claimed in claim 1, wherein the generating means comprises:
   a storage circuit;
   a current source for charging the storage circuit;
   first gate means for energizing the current source in response to the first operating signal;
   second gate means for deenergizing the current source in response to the second operating signal; and
   third gate means for discharging the storage circuit.

6. Apparatus, as claimed in claim 5, wherein the current source comprises a constant current source.

7. In a system comprising a gas-filled tube that produces light by conducting current after a predetermined voltage is applied across the tube, improved apparatus for maintaining the light intensity at a predetermined value for a predetermined time period comprising:
   control means for applying the predetermined voltage across the tube at a predetermined time and for controlling the amount of current flowing through the tube in response to a control signal and a termination signal;
   first means for generating a first operating signal in response to the predetermined voltage applied across the tube;
   second means for generating a second operating signal in response to the current flowing through the tube;
   third means responsive to the second operating signal for generating a termination signal within a predetermined time period after receipt of the second operating signal;

generating means for generating a first control signal monotonically varying in a first direction in response to the first operating signal, for terminating the generation of said first control signal in response to the second operating signal and for generating a second control signal monotonically varying in a second direction in response to the second operating signal;

fourth means for transmitting the first and second control signals generated by the generating means to the control means, whereby the initial amount of current flow through the tube is proportional to the length of time between the application of voltage across the tube and the commencement of current conduction through the tube and whereby the current flow through the tube decreases subsequent to the initial current flow so that the intensity of the light produced by the tube remains constant; and fifth means for transmitting the termination signal to the control means, whereby the current flow through the tube substantially decreases so that the tube ceases to produce light.

8. Apparatus, as claimed in claim 7, wherein the control means comprises an electronic current valve connected in series with the tube.

9. Apparatus, as claimed in claim 7, wherein the first means comprises an electronic logic circuit.

10. Apparatus, as claimed in claim 7, wherein the second means comprises a resistance connected in series with the tube.

11. Apparatus, as claimed in claim 7, wherein the third means comprises a monostable multivibrator.

12. Apparatus, as claimed in claim 7, wherein the generating means comprises:
a storage circuit;
a current source for charging the storage circuit;
first gate means for generating the current source in response to the first operating signal;
second gate means for deenergizing the current source in response to the second operating signal; and
third gate means for discharging the storage circuit in response to the termination signal.

13. Apparatus, as claimed in claim 1, wherein the current source comprises a constant current source.

14. Apparatus, as claimed in claim 11, wherein the control means comprises a flipflop circuit connected to the output of the monostable multivibrator.

15. A method for maintaining the light intensity produced by a gas-filled tube at a predetermined value, said method comprising the steps of:
applying a predetermined substantially constant d.c. voltage across the tube at a predetermined time;
conducting an initial amount of current through the tube having a magnitude directly proportional to the length of time between the application of the predetermined voltage across the tube and the commencement of current conduction through the tube; and
decreasing the amount of current conducted through the tube as a function of time so that the intensity of light produced by the tube remains constant irrespective of the pulsing rate at which the d.c. voltage is applied across the tube.

16. A method for maintaining the light intensity produced by a gas-filled tube at a predetermined value, said method comprising the steps of:
applying a predetermined voltage across the tube at a predetermined time;
generating a first operating signal in response to the application of the predetermined voltage across the tube;
generating a second operating signal in response to the commencement of current conduction through the tube;
generating a first control signal monotonically vaying in a first direction in response to the first operating signal;
controlling the value of the initial current conducted through the tube in proportion to the maximum absolute value of the first control signal; and
decreasing the amount of current conducted through the tube as a function of time so that the intensity of light produced by the tube remains constant.

17. A method, as claimed in claim 16, wherein the step of generating a first control signal comprises the step of generating a linear ramp signal.

18. A method, as claimed in claim 16, wherein the step of decreasing the amount of current conducted through the tube comprises the steps of:
generating a second control signal in response to the second operating signal, said second control signal varying monotonically in a direction opposite the first control signal; and
controlling the current conducted through the tube in proportion to the value of the second control signal, whereby the light produced by the tube remains constant.

19. A method, as claimed in claim 18, wherein the step of generating a second control signal comprises the step of generating an exponentially-varying signal.

20. A method for maintaining the light intensity produced by a gas-filled tube at a predetermined value for a predetermined time period, said method comprising the steps of:
applying a predetermined voltage across the tube at a predetermined time;
conducting an initial amount of current through the tube having a magnitude proportional to the length of time between the application of the predetermined voltage across the tube and the commencement of current conduction through the tube;
decreasing the amount of current conducted through the tube as a function of time so that the intensity of light produced by the tube remains constant; and substantially terminating the conduction of current through the tube at the end of the time period beginning at the commencement of current conduction through the tube and having a duration equal to the predetermined time period.

21. A method, as claimed in claim 20, wherein the step of conducting an initial amount of current through the tube comprises the steps of:
generating a first operating signal in response to the application of the predetermined voltage across the tube;
generating a second operating signal in response to the commencement of current conduction through the tube;

generating a first control signal monotonically varying in a first direction in response to the first operating signal; and controlling the value of the initial current conducted through the tube in proportion to the maximum absolute value of the first control signal.

22. A method, as claimed in claim 20, wherein the step of generating a first control signal comprises the step of generating a linear ramp signal.

23. A method, as claimed in claim 20, wherein the step of decreasing the amount of current conducted through the tube comprises the steps of:

generating a second control signal in response to the second operating signal, said second control signal varying monotonically in a direction opposite the first control signal; and controlling the current conducted through the tube in proportion to the value of the second control signal, whereby the light produced by the tube remains constant.

24. A method, as claimed in claim 23, wherein the step of generating a second control signal comprises the step of generating an exponentially-varying signal.

25. A method, as claimed in claim 20, wherein the step of substantially terminating the conduction of current through the tube comprises the steps of:

generating an operating signal in response to the commencement of current conduction through the tube;

generating a termination signal within a predetermined time period after receipt of the operating signal; and substantially decreasing the current flowing through the tube in response to the termination signal, so that the tube ceases to produce light.

* * * * *